Nov. 28, 1950 G. K. RICHARDSON 2,531,587
SUPPORT BEARING AND GEAR ASSEMBLY
Original Filed July 3, 1944 3 Sheets-Sheet 1

Inventor
George K. Richardson
By his Attorney

Inventor
George K. Richardson
By his Attorney

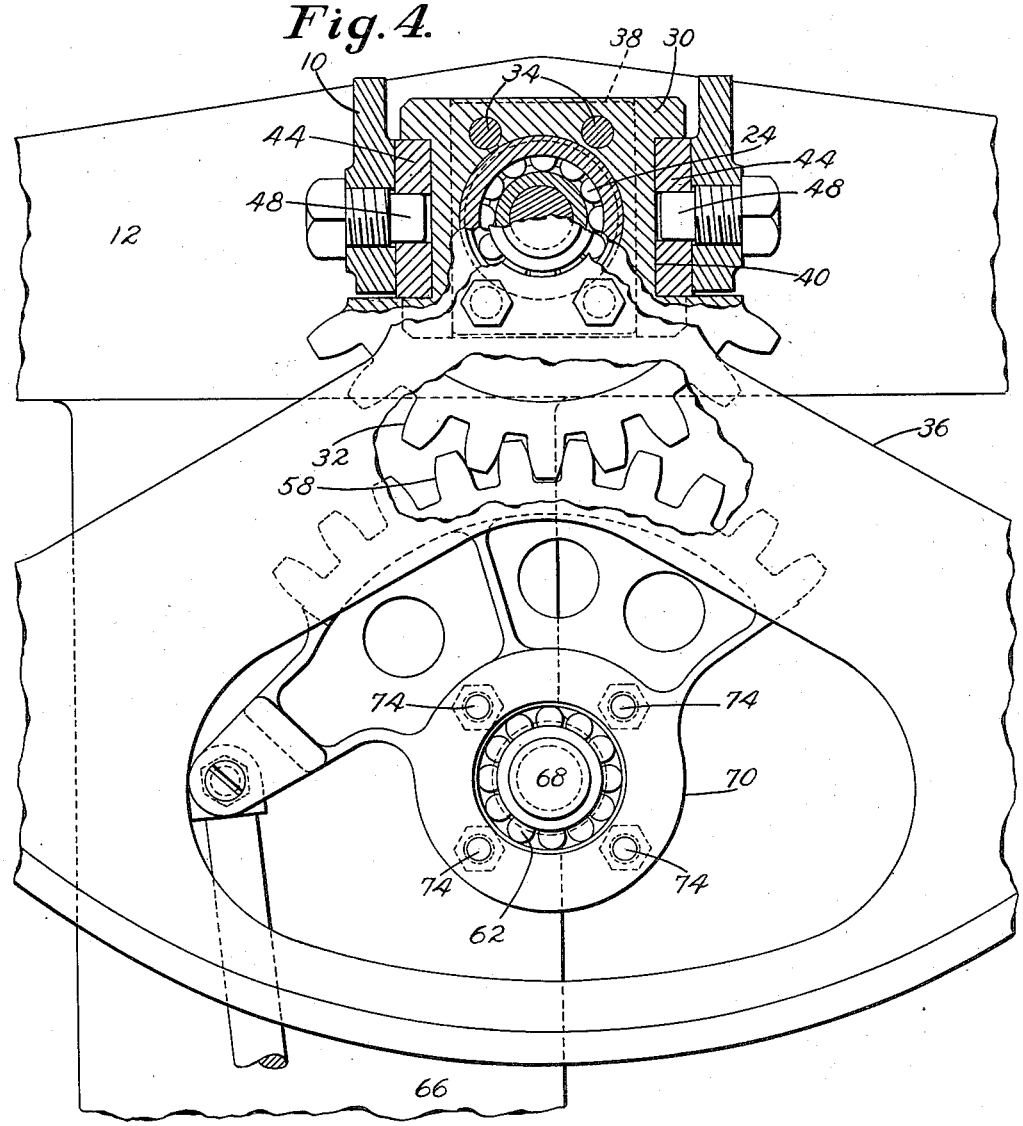

Patented Nov. 28, 1950

2,531,587

UNITED STATES PATENT OFFICE 2,531,587

SUPPORT BEARING AND GEAR ASSEMBLY

George K. Richardson, Wenham, Mass., assignor to United Shoe Machinery Corporation, Flemington, N. J., a corporation of New Jersey Original application July 3, 1944, Serial No. 543,345. Divided and this application December 2, 1946, Serial No. 713,571

5 Claims. (Cl. 89—37)

This invention relates to means for supporting a column combined with means for turning the column and is herein illustrated in its application to mechanism constructed and arranged to support a column on which guns are mounted combined with means for turning the column in order to move the guns in azimuth. In certain aspects, however, the invention is not limited to ordnance but relates to combinations of supporting and actuating means applicable generally to power operated mechanisms.

It is an object of the present invention to provide mechanism for supporting a gun column and turning the column in azimuth, which mechanism is not injuriously affected by the bending of the column under the thrust of the recoil of the guns. More specifically, it is an object of the present invention to provide mechanism for supporting and turning the gun column illustrated and described in my copending application for United States Letters Patent, Serial No. 543,345, filed July 3, 1944, now Patent No. 2,463,056 of which the present application is a division. With the above objects in view, the present invention in one aspect thereof contemplates the provision of means for effecting turning movement of the column, said means including an operating member constructed and arranged to turn with the column in azimuth but so connected to the column that it does not respond to bending movement of the column under the thrust of the recoil of the guns. As herein illustrated, the operating member is a gear segment which meshes with a power driven gear element. These gear elements are required to mesh perfectly and to operate with no appreciable play. The achievement of this result is effected in the illustrated gun mount by the construction and arrangement of the gear segment whereby it does not react to the bending of the column in such a way as to injure the teeth of the gear elements.

For mounting the driven gear segment relatively to the column a mechanism is provided having the general characteristics of a universal joint. The construction of this mechanism not only obviates injury to the teeth of the gear elements but also obviates the necessity of accurately alining the upper and lower bearings of the column. In its application to said mechanism the invention is not limited to ordnance but is applicable generally to mechanical combinations. This feature of the invention comprises an operating member, which in the illustrated construction is the gear segment constructed and arranged to turn with the gun supporting column, said member being mounted for rotary movement about a first axis and being characterized by cylindrical surfaces struck from a second axis intersecting the first axis, means constructed and arranged to bear on the cylindrical surfaces of said operating member, and an actuated member, the gun supporting column in the illustrated construction, mounted on said means for turning movement about a third axis angularly disposed to the first axis, such turning movement, in the case of the illustrated gun mount, being the bending of the column under the recoil of the guns. As herein illustrated, the means for mounting the column comprises two shoes constructed and arranged for bearing engagement with cylindrical surfaces of the hub of the gear segment, this construction and arrangement of the shoes and the hub of the gear segment affording relative turning movement of the gear segment and the column about the second axis above referred to. For connecting the gun supporting column to the actuating assembly, trunnion pins mounted in the column are journaled in bearings in the shoes for turning movement about the third axis above referred to. Such turning movement occurs in response to the severe thrust exerted against the column by the simultaneous recoil of the four guns. The movement is, of course, very slight, probably scarcely perceptible, but if the gun mount were so constructed that such turning movement caused a corresponding movement of the driven gear segment the effect on the closely meshing teeth of the gear elements would be injurious.

These and other features of the invention will now be described with reference to the accompanying drawings and pointed out in the appended claims.

In the drawings,

Fig. 4 is a plan view partly in section on the line IV—IV of Fig. 2.

Figure 1:
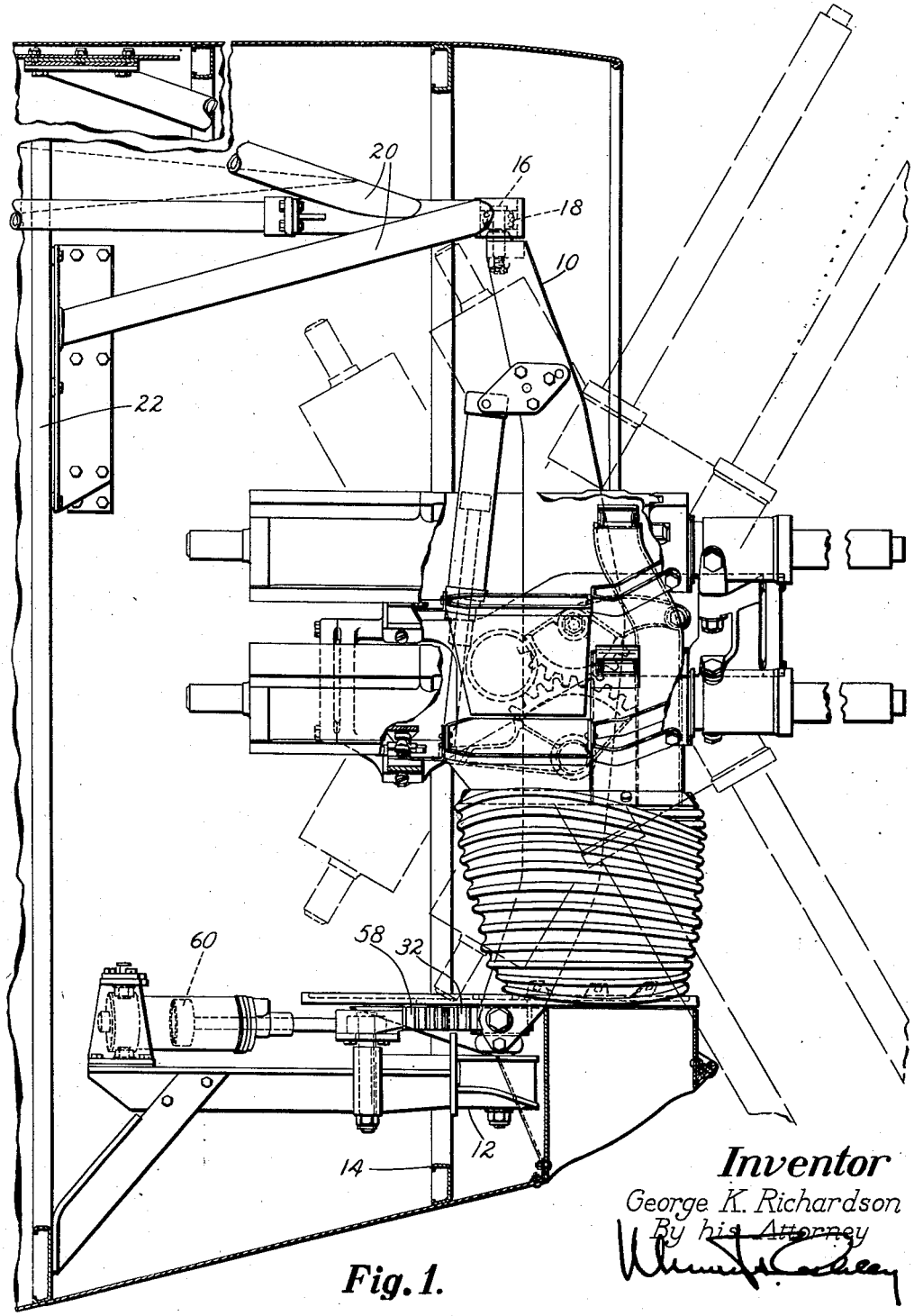
Fig. 1 is a side elevation of an airplane gun mount and its supporting and actuating mechanism embodying the features of the present invention, the fuselage of the airplane being shown in section and the guns being partly broken away to show a portion of the column and other mechanisms.
Figure 2:
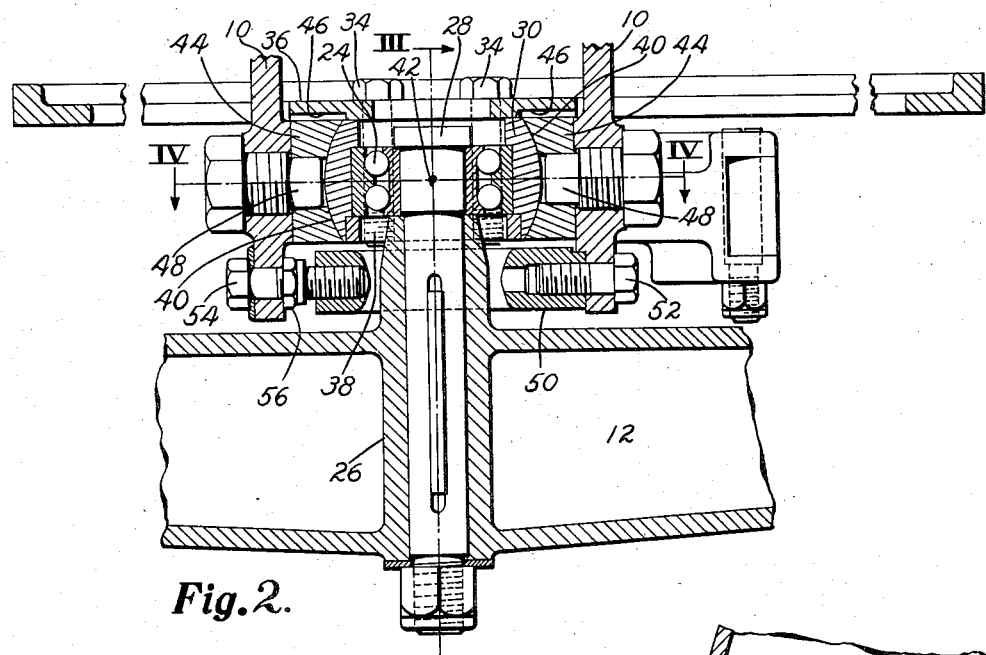
Fig. 2 is a sectional elevation of the lower portion of the column and its supporting and actuating assembly taken on a plane common to the axis of the bearing and looking toward the front end of the airplane.
Figure 3:
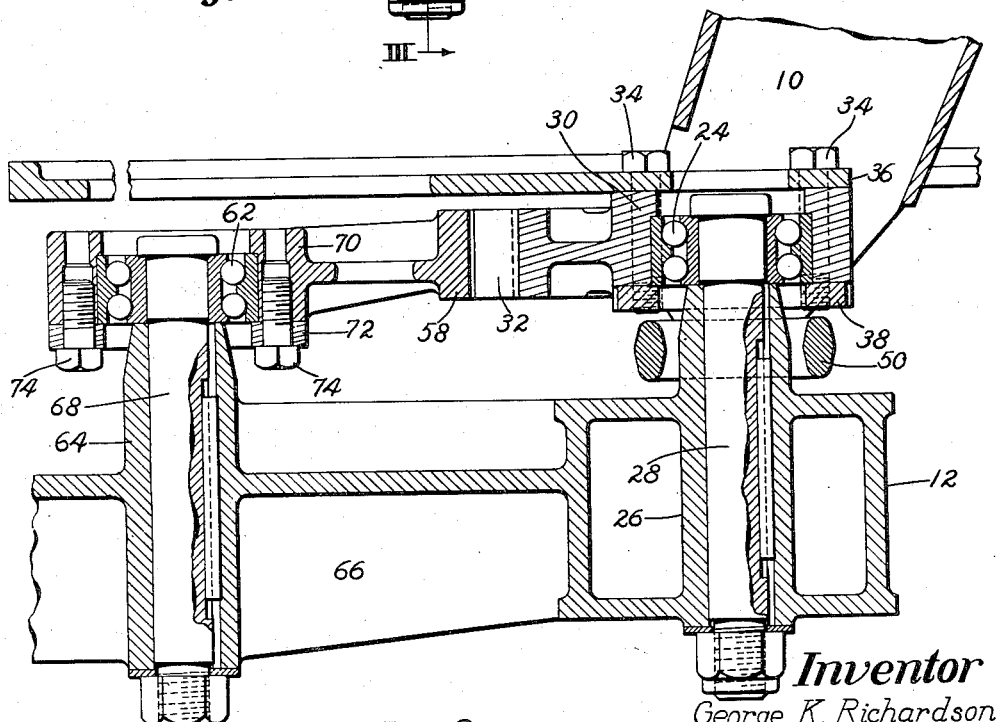
Fig. 3 is a sectional view taken on the line III—III of Fig. 2.

Referring to Fig. 1, a column 10 which mounts a plurality of guns, is supported on a crosshead 12 secured to a rib 14 of the fuselage and a similar rib (not shown) in the opposite side of the fuselage. The column 10 is a generally bow-shaped member of channel iron construction having at its upper end a pivot pin 16 mounted in a self-alining bearing 18 contained in a supporting tubular structure 20 secured to a rib 22 of the fuselage. The mounting for the lower portion of the column is illustrated in Figs. 2, 3 and 4. Referring to Fig. 2, a ball bearing 24 is supported on a hollow cylindrical structure 26 formed in the crosshead 12 and is secured thereto by a clamping bolt 28 the head of which engages the inner race of the bearing 24. The illustrated ball bearing is constructed to resist both radial and axial thrusts. The outer race of the ball bearing is mounted in a counterbore in the hub 30 of a gear segment 32 (Fig. 4) and is secured in said counterbore by four clamping screws 34 which extend through a plate 36 overlying the hub 30 and through the hub itself and are threaded into a rectangular plate 38 mounted in a recess in the bottom of the hub 30. The opposite side faces 40 of the hub 30 are of cylindrical shape having a common axis identified by the point 42 (Fig. 2). Two shoes 44 having inner cylindrical surfaces complemental to the cylindrical side faces of the hub 30 are mounted on said side faces to turn freely thereon. The bottom of the plate 36 has marginal recesses 46 formed therein to provide clearance for a limited movement of the shoes on the hub. The shoes are bored to provide bearings for trunnion pins 48 extending inwardly from the lower portions of the side walls of the column 10. For holding the side walls of the column against spreading, a ring 50 is positioned between the lower extremities of said side walls and is secured to the right side wall, as seen in Fig. 2, by a clamping screw 52 and is positioned relatively to the left side wall by a screw 54 which is adjustable to determine the spacing of the side walls from each other and is secured in adjusted position by a lock nut 56. It will be seen that the illustrated organization provides a universal bearing for the lower portion of the column on which the column itself is mounted for turning movement on an axis extending transversely of the gun mount, said axis being identified by the trunnion pins 48. It will be understood that the turning movement of the lower portion of the column about this axis results from the slight bending movement imparted to the column by the severe thrust of the simultaneous recoil of the four guns. The lower portion of the column is also free to turn about a second axis identified by the common center 42 (Fig. 2) of the curvature of the side walls of the hub 30. During the movement of the guns in azimuth the column 10 turns about a third axis identified with the ball bearing 24. The universal mounting thus provided permits the lower portion of the column to turn freely on the ball bearing 24 whether or not the axis of that bearing is accurately alined with the axis of the bearing 18 (Fig. 1) at the upper end of the column. The gear segment 32 (Fig. 4) meshes with a similar gear segment 58 actuated by hydraulic means including a piston 60 (Fig. 1) to turn the gun assembly in azimuth. The gear segment 58 is mounted to turn on a ball bearing 62 (Fig. 3) clamped to a cylindrical structure 64 in an extension 66 of the crosshead 12 and is clamped to the upper end of said cylindrical structure by a bolt 68. The outer race of the ball bearing is mounted in a counterbore in the hub 70 of the gear segment 58 and is held therein by an annular retaining plate 72 secured to the bottom of the hub 70 by screws 74. Inasmuch as the two segments 32 and 58 are supported on a single crosshead any slight movement of the crosshead by the thrust of the recoil of the guns will cause no relative movement of the gear segments. Furthermore, any turning movement of the lower portion of the column as the column bends under the thrust of the recoil of the guns will cause no relative movement of the gear segments since the provision of the trunnion mounting of the lower portion of the column in the shoes 44 provides for such turning movement of the lower portion of the column.

Having thus described my invention, what I claim as new and desire to secure by Letters Patent of the United States is:

1. In combination, a first gear element, a second gear element meshing with said first gear element, means mounting the second gear element for rotary movement about a first axis, an actuated member, a hub of said second gear element having cylindrical bearing surfaces having a common axis intersecting said first axis, means on said hub mounting said actuated member for swinging movement about a transverse axis angularly disposed to the first axis, said means on said hub being slidably mounted on said cylindrical bearing surfaces so as to permit relative turning movement between the second gear element and the actuated member about said common axis.

2. In combination, a first gear element, a second gear element meshing with the first gear element, means mounting the second gear element for rotary movement about a first axis, a column, a hub of said second gear element having cylindrical bearing surfaces having a common axis intersecting said first axis, two shoes mounting said column for swinging movement about a transverse axis angularly disposed to the first axis, said shoes being constructed and arranged for bearing engagement with the hub of said cylindrical bearing surfaces for relative movement of the shoes and the second gear element about said common axis.

3. A gun mount comprising a column constructed and arranged for turning movement in azimuth, a self-alining bearing at one end of the column, and a combined supporting and actuating means at the other end of the column comprising a gear element mounted for rotary movement about a first axis, a hub of said gear element having cylindrical bearing surfaces having a common axis intersecting said first axis, means interconnecting the gear element and the column, said interconnecting means being constructed and arranged to permit relative turning movement of the gear element and the column about a transverse axis, said interconnecting means being slidably mounted on said bearing surfaces so as to permit movement of the lower portion of the column about said common axis.

4. A gun mount comprising a column constructed and arranged for turning movement in azimuth, a cradle mounted on the column for movement in elevation, a plurality of guns carried by the cradle, a self-alining bearing at the upper end of the column, and a combined supporting and actuating means at the lower end of the column comprising a rotor mounted to turn about a first axis, bearing means mounted on the rotor for movement thereon about a second axis at right angles to the first axis, and means mounting the lower portion of the column on said bearing means for movement about a third axis angularly disposed to the first axis.

5. A gun mount comprising a column constructed and arranged for turning movement in azimuth, a cradle mounted on the column for movement in elevation, a plurality of guns carried by the cradle, a self-alining bearing at the upper end of the column, a supporting means at the lower end of the column comprising a rotor mounted to turn about a first axis, bearing means mounted on the rotor for movement thereon about a second axis at right angles to the first axis and means mounting the lower portion of the column on said bearing means for movement about a third axis angularly disposed to the first axis, and means for rotating the column in azimuth comprising a driven gear element constructed and arranged to turn with said rotor about said first axis and a driving gear element constructed and arranged to mesh with said driven gear element.

GEORGE K. RICHARDSON.

REFERENCES CITED

The following references are of record in the file of this patent:

UNITED STATES PATENTS

| Number | Name | Date |
| --- | --- | --- |
| 794,247 | Palmer | July 11, 1905 |
| 940,145 | Gray | Nov. 16, 1909 |
| 1,210,200 | Pentony | Dec. 26, 1916 |
| 2,262,710 | Lang | Nov. 11, 1941 |